Sept. 2, 1958          W. D. APPEL          2,850,065

FLEXIBLE WHEEL ASSEMBLY

Filed March 22, 1954          2 Sheets-Sheet 1

INVENTOR.
WALTER D. APPEL

BY
SMITH, OLSEN & KOTTS

ATTORNEY

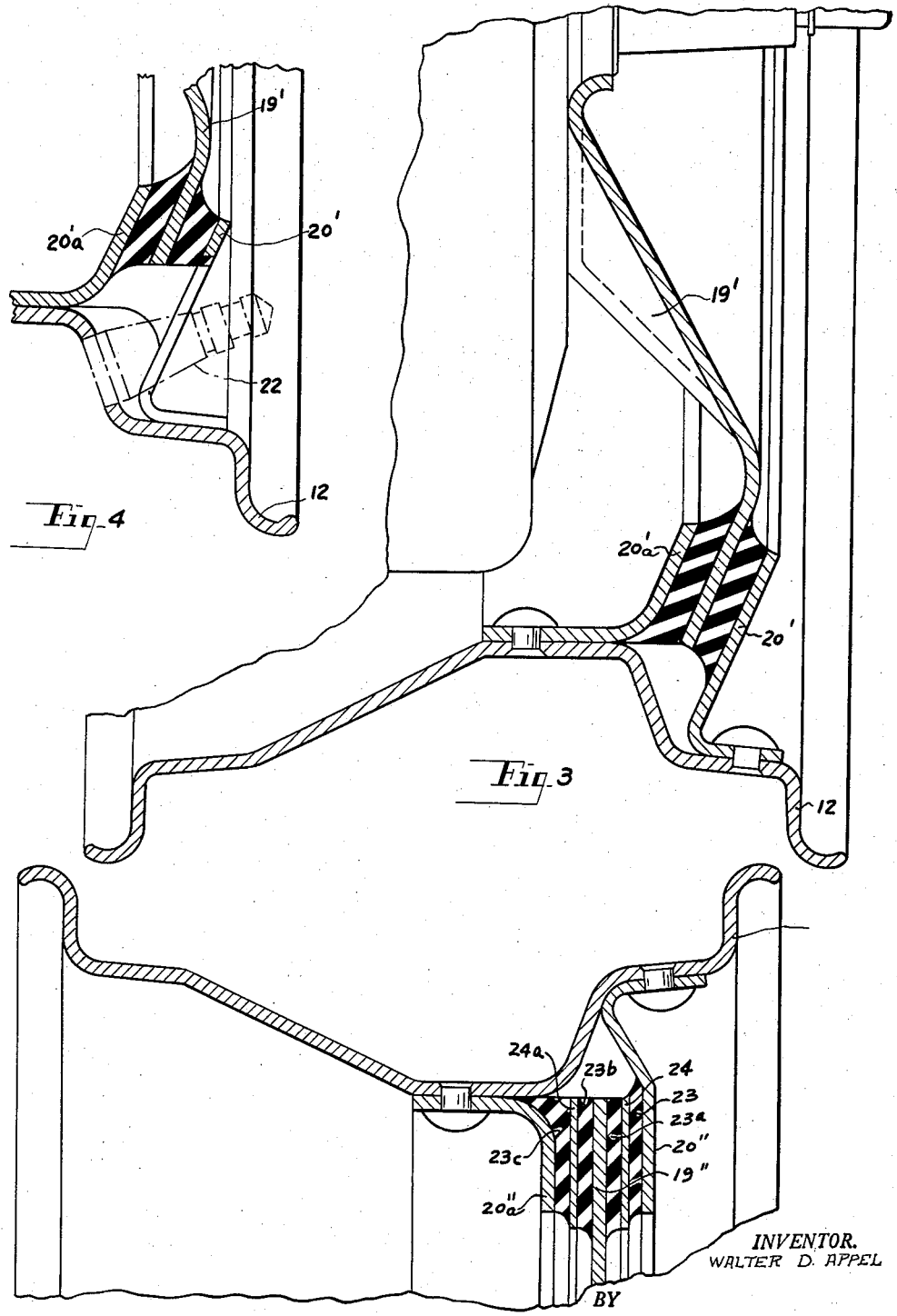

2,850,065
FLEXIBLE WHEEL ASSEMBLY

Walter D. Appel, Orchard Lake, Mich.

Application March 22, 1954, Serial No. 417,575

4 Claims. (Cl. 152—41)

The present invention relates to vehicle wheels and more particularly to a vehicle wheel in which the outer rim is connected to the body portion of the wheel by the use of resilient sound-absorbing connecting members secured between the rim portion and the outer circumferential edge portion of the body portion of the wheel.

A problem which arises in the vehicle art concerns the acoustical treatment of the body of the vehicle to muffle the road noises which are transmitted into the vehicle chassis structure and from the chassis structure into the body. The current trend in the automotive industry is toward the use of the unitized or frameless vehicle body construction providing a stiff body structure which, like the previous use of multiple, hard, body mounting shims between the vehicle body and a conventional chassis, has resulted in an increased road noise problem in such rigid vehicle body structures. This road noise condition also has been aggravated by the relatively higher speeds at which automotive vehicles are now designed to travel, the result being that small, high frequency vibrations are transmitted into the body structure as the vehicle travels over the road surface.

In some previous attempts to solve the problem presented, low-pressure pneumatic tires have been suggested. Such tires absorb some of the shocks and vibrations transmitted from the road surface, but have the disadvantage of impairing the control of the vehicle particularly when making a fast turn. However, in order to have such tires fully effective to absorb the road vibrations, it would be necessary to have such flexible sidewalls that additional tire noise will result. Use of such very low-pressure tires also affects the construction of the tread and the shoulder in such a manner as to increase tire squeal particularly when making turns.

The acoustical insulation in the vehicle body tends to muffle and absorb some of the noise caused by the road vibration, but this is achieved at the expense of added weight and cost. Such materials also tend to lose efficiency during the life of the vehicle. Acoustical undercoatings applied to the exposed running gear portion of the vehicle and the underside of the body portion of the vehicle, frequently become incrusted with dirt and corrosive materials thrown up from the road surface and not only lose their sound efficiency but also actually break away from the surfaces and drop off from the areas to which they are initially applied.

The springing of the body with respect to the running gear portions of the vehicle have attempted to provide structures in which the high-amplitude, low-frequency road shocks, may be taken. This requires a soft spring suspension which together with low-pressure tires, have had the effect of making the vehicle body less noisy. This is accomplished at the sacrifice of roadability and steering accuracy of the vehicle. Such spring suspensions are not effective in absorbing the small-amplitude, high-frequency vibrations which are generated when the vehicle passes over the road surface.

Prior attempts to solve this problem long existing in this art have, therefore, taken the form of permitting the vibrations generated as the vehicle passes over the road surface, to travel through the wheel and axle structure to the springs and attempt to absorb such vibrations at these points. As distinguished from such prior attempts, the present invention proposes to solve the problem by interposing a resilient sound-absorbing material adjacent the rim element and between the rim of the wheel and its body structure or web in such a manner as to permit absorption of the small-amplitude, high-frequency vibrations transmitted from the road surface through the tire to the rim and from the rim to the body of the wheel.

Accordingly, it is an object of the present invention to provide a vehicle wheel construction in which the rim and tire are resiliently connected with the body portion of the wheel through the medium of a resilient vibration absorbent connector element.

It is a further object of the present invention to provide a resilient wheel construction in which the rim of the wheel is acoustically insulated from the body portion thereof, by resilient vibration absorbent connecting elements formed of a resilient material, such as rubber, bonded to the respective portions to be connected to provide a cushioned floating connection between the rim portion of the wheel and the body portion of the wheel. This construction permitting a sufficient amount of radial elasticity to absorb the road generated vibrations without excessive lateral or side movement being permitted between the rim portion and body portion of the wheel.

It is a further object of the present invention to provide a resilient wheel construction in which the rim and tire are acoustically insulated from the body portion of the wheel and are resiliently connected thereto by means of a resilient connecting element which permits a controlled maximum radial movement between the rim and the body portion of the wheel while minimizing side movement of the rim in relation to the body portion of the wheel.

It is a further object of the present invention to provide a resilient wheel construction in which the rim portion is resiliently secured to the web of the wheel by spaced circumferential flange members having spaced points of attachment to the rim, and in which the resilient mounting material is interposed between said flanges and the wheel web at its outer circumferential edge portion.

It is a further object of the present invention to provide a resilient wheel construction which is relatively simple in construction and which is adapted for production in such a manner as to secure the optimum benefits of mass production techniques. The wheel being such that it can be used with standard rims and may be readily attached to or detached from a conventional hub construction by conventional means so that it may be readily substituted for conventional wheels on existing vehicles as well as being adapted for use in connection with new vehicle construction.

Prior to the present invention, various arrangements have been suggested to solve the general problems referred to above. The structures suggested previously have not been commercially successful in the automotive field nor have they found commercial acceptance therein because of various structural and functional differences between the construction herein disclosed and the constructions proposed by the prior experimenters in this field. The prior art shows that in the past patents have been issued on resilient wheel constructions in which the problems inherent in the manufacture of such units for use in large-scale mass production construction of vehicles apparently has not been considered by such inventors. The result is that many of the prior art wheels are too heavy and are of such a construction that they cannot be applied to automotive vehicles. Others have provided for radial flexibility with little or no axial flexibility. Others have provided axial flexibility but with little radial flexibility. Still other constructions have proposed a resilient connection between the rim and the body portion of the wheel which is very expensive to construct, and is not readily adaptable to production by mass production techniques. The prior art constructions also have not been such as to allow for the required amount of flexibility in a radial direction while controlling the amount of axial flexibility to assure positive control of the vehicle to which such wheels are attached.

As will be seen from the description which follows, I connect the rim and the web of the wheel with resilient connecting members which form a single integral unit in which the resilient materials and the metal parts are permanently attached as by thermal bonding. This eliminates a great many unnecessary features of the previously proposed resilient wheels, such as bolts, dowels, bosses, etc., and yet makes it possible to provide a more flexible, yet more sturdy connection between the rim and the wheel.

Other objects of this invention will appear in the following description and appended claims, reference being had to the accompanying drawings forming a part of this specification wherein like reference characters designate corresponding parts in the several views.

In the drawings:

Fig. 3 is a fragmentary sectional view showing a modified form of the invention;

Fig. 4 is a fragmentary sectional view of a portion of said modified form shown at Fig. 3 and showing the tire valve construction.

Fig. 5 is a fragmentary sectional view of another modified form of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
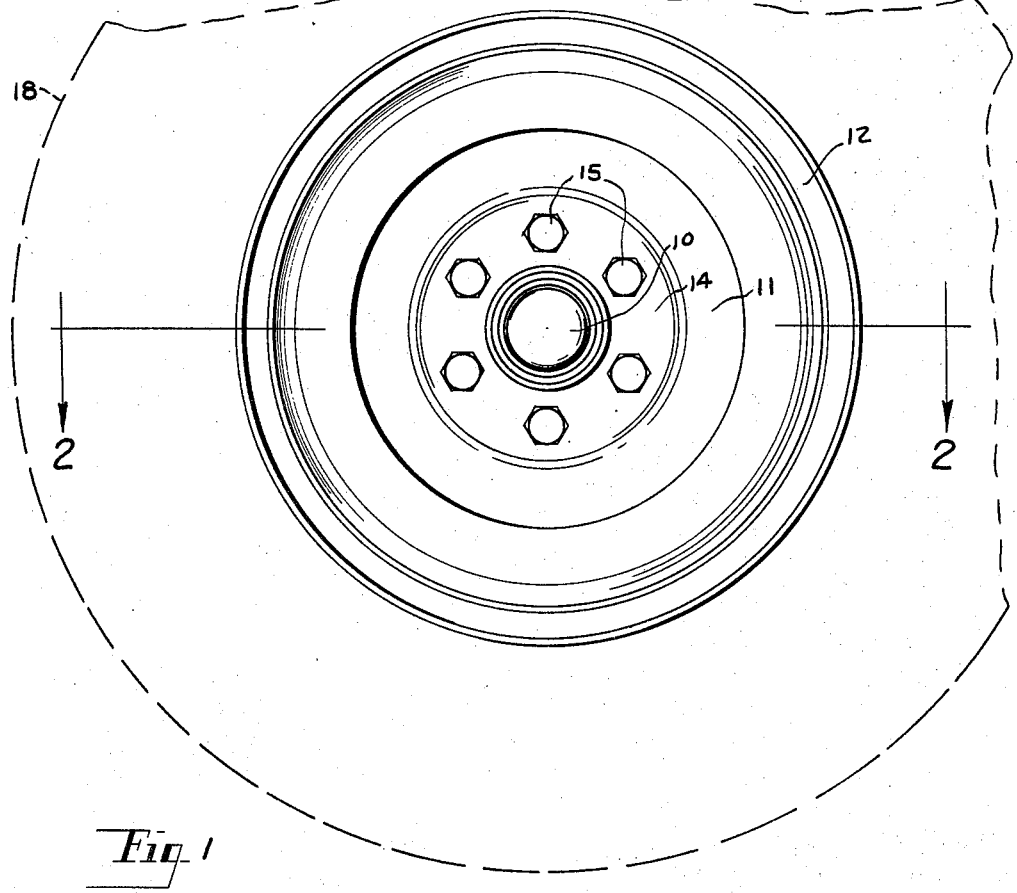
Fig. 1 is a fragmentary side elevational view of a resilient wheel structure embodying the present invention.
Figure 2:
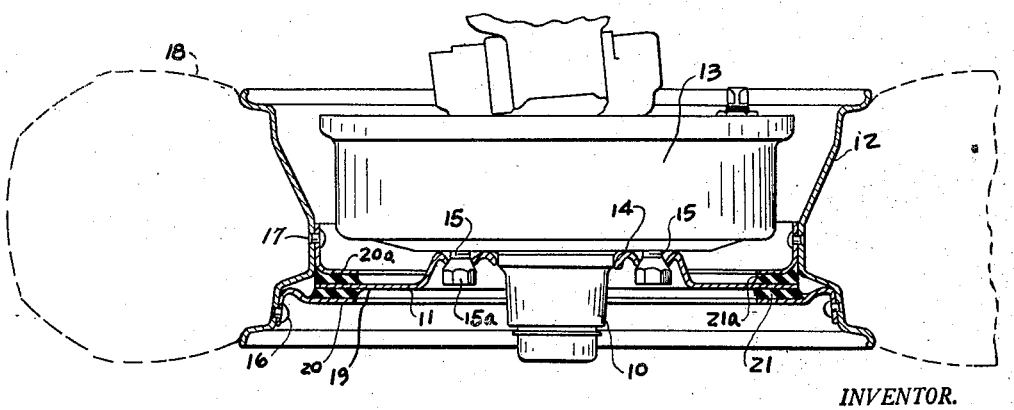
Fig. 2 is a fragmentary sectional view taken generally along line 2—2 in the direction of the arrows, Fig. 1.

In Figs. 1 and 2, the wheel is shown as having a hub 10 with a radial flange or web 11, and a rim 12 of the conventional drop center type. A brake drum 13 is attached to the flange of the hub 10. The center of the radial flange or web 11 is provided with a flanged central opening 14 provided with a bolt circle having spaced bolt holes corresponding in number and placement to the wheel securing lugs 15 carried by the brake drum and engaged by the wheel securing nuts 15a detachably connected with said wheel lugs 15. A tire 18 is shown in dotted line mounted on the rim 12. The rim 12 is secured to the flanges 20 and 20a at spaced points by rivets 16 and 17 or the like.

A novel feature of my invention resides chiefly in the construction of the resilient connecting member. As shown in Fig. 2, this comprises the outwardly radiating circumferential portion 19 of the wheel flange or web 11, and a pair of inwardly radially extending spaced flanges (20, 20a) attached to the rim 12 by securing means such for example as the rivets 16 and 17 or any other suitable means. The flanges 20 and 20a enclose therebetween the outwardly radiating circumferential edge 19 of the wheel flange of web 11 and in laterally spaced relation thereto. A pair of resilient deformable masses (21, 21a) are thermally bonded on the sides of the outwardly radiating circumferential portion 19 of the wheel flange of web 11 and the adjacent surfaces of the radially extending spaced flanges (20, 20a). The resilient deformable masses (21, 21a) consist preferably of any suitable kind of either natural or synthetic rubber or any suitable blends thereof, which will provide the desired resiliency to assure dampening of the road induced vibrations and the formation of a barrier to prevent transmission thereof to the wheel web 11.

The resilient connecting member is so formed and mounted as to permit a controlled, maximum radial movement with a minimum side movement of the rim 12 in relation to the wheel web 11. It will be seen in this embodiment that the resilient connecting member constitutes an integral unit connecting the wheel web 11 and the rim 12. This construction permits forming the resilient connecting member by mass production methods by bonding the resilient masses in a simple two-piece mold between the outer circumferential portion 19 of the wheel member and the flanges 20 and 20a before connecting said flanges to the rim. The flanges 20 and 20a and the outer circumferential portion 19 each have flat surface portions to which the resilient mass is bonded. This assures optimum use of large volume mass production methods in the manufacture of the said units.

As here shown, the flange 20a is generally L-shaped in cross section. The surface of one leg of the L overlies the circumferential portion 19 of the wheel web 11, and the resilient mass 21a is bonded thereto and to the adjacent surface of the circumferential portion 19 of the wheel web 11. The other leg of the L extends angularly to engage the drop-center portion of the rim 12 and is rigidly secured thereto by the rivet 17 or by any other desired securing means.

The flange 20 is formed with a flat surface overlying the circumferential portion 19 of the wheel web 11 to which the resilient mass 21 is bonded and extends between it and the circumferential portion 19 of the wheel web 11. The said flat surface terminates in an end portion which is shaped to conform to the portion of the rim 12 adjacent its outer bead flange. The rim 12 is secured to said end by the rivet 16 or any other suitable fastening means.

The construction of the flanges 20 and 20a thus provide for a wide area of contact with the respective portions of the rim 12 to which they are attached and when secured thereto provide a rigid support for the rim at laterally spaced points. This assists in providing lateral stability of the rim 12 at all times.

The arrangement of the parts, whereby the radially extending spaced flanges (20, 20a) and the outwardly radiating wheel member 19 overlap, provides a mechanical lock of the parts which, in the event of a failure of the resilient material (21, 21a) will still provide a lock between the rim 12 and the wheel web 11 and will prevent the rim and tire from being thrown from the wheel.

The construction of the flanges 20 and 20a and their mounting to the rim 12 also assists in dissipating heat generated in the resilient masses 21 and 21a. Heat also is dissipated through the web 11 of the wheel. This construction thus provides a free radial movement between the rim 12 and the web 11 of the wheel at which times the resilient masses 21 and 21a are subjected to shear. Restricted lateral movement of the rim 12 relative to the web 11 is permitted only to the extent of the displacement of either one or the other of the resilient masses 21 and 21a by the compression forces imposed thereon by reason of such lateral movement.

The rim 12 and the flanges 20 and 20a provide the optimum circumferential area adjacent the underside of the rim 12 to assure the optimum volume of the resilient masses 21 and 21a at points closely adjacent to the rim. The rim 12 is secured to the flanges 20 and 20a after the flanges are bonded to the resilient masses 21 and 21a and provides a fixed spacing of the said flanges.

In the event it is desired to vary the amount of lateral displacement of the rim to the wheel web in either direction, this may be readily accomplished by varying either the mass or the resiliency of the resilient deformable mass interposed between the flanges and the sides of the wheel web.

In the embodiment of the invention shown in Fig. 2 the outwardly radiating wheel web 11 is preferably circumferential and the radially spaced flanges (20, 20a) lie substantially in planes perpendicular to the axis of rotation of the wheel. As a result, the movements of the tire and rim are guided in a substantially flat plane.

A second embodiment of the invention is shown in Fig. 3. Here, the outwardly radiating wheel member 19' is circumferentially dished, and the spaced flanges 20', 20'a, are circumferentially arcuate.

An opening in the rim 12 and in the wheel web 11 is provided for the tire tube valve stem 22 as shown in Fig. 4, and is the construction which will be utilized in all forms of the invention.

In the embodiment of the invention shown in Fig. 3, the movements of the tire and rim are guided in a spherical arc in relation to the hub. This has the effect of reducing roll of the vehicle, as it simulates a high roll-center of the vehicle when the tire and rim are subjected to side thrust, as in fast "cornering."

A further embodiment of the invention is shown in Fig. 5. This differs from the previous embodiments as above described in that the resilient deformable mass consists of laminae of deformable (23, 23a, 23b, 23c) and non-deformable (24, 24a) materials. The inwardly extending edges of the resilient members are stepped as here shown to facilitate molding of the members by the use of a simple two-piece rubber vulcanization mold. The deformable material is a resilient material as previously disclosed, and the non-deformable material preferably is a metal such as steel. This type of construction forms a series of sound-insulating dams between the rim and the hub to absorb and prevent vibration from traveling from the road surface through to the vehicle structure. In this construction radial movement between the rim and the wheel web is permitted to the extent desired while the lateral movement is yieldably resisted by the resilient materials.

In all the embodiments of the invention as above described, it will be seen that a vibration absorbing resilient cushion is provided between the rim portion and the body portion of the wheel structure. While primarily designed to overcome the effect of road induced vibrations in causing noise to be transmitted into the body construction, it will be evident to those skilled in this art that other novel and beneficial results may also be achieved by the use of this construction. When one considers the entire wheel, rim and tire construction as a rotating flywheel, the rim and tire provide the circumferential rotating flywheel mass and the wheel body the web which extends between said mass and the hub. Thus, in a conventional rigid wheel construction, the hub, being fixed, would require the tire and rim to rotate about the fixed axis of rotation of the hub. In the present invention, in the event of displacing forces, the rim and tire may move relative to the wheel body as may be required to compensate for the displacing forces. Thus, the wheel of the present invention may act also as a vibration dampener for vibrations transmitted to the wheels from the axles. Also, within the limits permitted by the resilient connecting members, an unbalanced rim and tire assembly may rotate about an axis determined by the unbalanced condition of the assembly rather than about the fixed axis of rotation of the hub.

It will thus be seen that I have provided a resilient wheel construction which not only reduces the transmission of road induced vibration and resultant noises but also allows a limited self-balancing effect which permits the rim and tire to run more true.

The use of a resilient connecting member between the rim and the hub, in the manner described, also serves to add a certain amount of torsional flexibility between the axle drive shaft and the tires, which acts to reduce the shock load on the gears and drive shafts in the drive train, thereby increasing the life of the drive system before failure through fatigue.

The use of a resilient member immediately inside the standard lightweight conventional rim reduces to a minimum the mass of the unsprung weight. This adds substantially to the riding comfort of the vehicle as well as reducing the vibration and noise transmitted to the passengers.

While the embodiments I have shown have been directed at providing a resilient wheel for automotive vehicles, it is obvious to those skilled in this art that the same structure may be applied to any type of wheel without departing from the spirit of my invention. It is also to be understood that while the embodiments described above constitute preferred forms, other forms may also be provided within the scope of the following claims.

I claim:

1. A vehicle wheel adapted to receive a pneumatic tire comprising: an integral cylindrical rim section having a pair of axially spaced radially outwardly extending tire retaining flanges, a pair of axially extending bead seats, and a contoured axially extending drop center section interposed between the bead seats, said drop center section including a straight axially extending section in the area of the minimum radius of the rim, and an angularly related section between said straight axial section of minimum radius and each of the said bead seats; a pair of axially spaced members each having a contoured cylindrical section, and a radially inwardly extending flange, one of said members being secured to the aforesaid straight axially extending section and the other secured to one of the aforesaid bead seats with the flanges carried by said members spaced apart axially; a radial disk having an inner section defining a central hub receiving aperture contoured to provide a plurality of stud receiving apertures, the radial disk terminating in a radially extending section positioned in overlapping relation radially with respect to and axially between the aforesaid inwardly directed flanges carried by the rim; and resilient deformable masses thermally bonded to the confronting surfaces of the overlapping portions of the said radially extending section of said disk and said inwardly extending axially spaced flanges carried by the rim respectively.

2. A vehicle wheel as claimed in claim 1 and further characterized in that the said radially extending section of said disk positioned in overlapping relation with said rim carried flanges is positioned at an angle in relation to the plane of rotation of said wheel and said rim carried flanges are likewise positioned and parallel to said overlapped section whereby force applied to said rim in a direction parallel to the plane of rotation of said wheel will result in arcuate movement of the rim in relation to the hub.

3. A vehicle wheel adapted to receive a pneumatic tire comprising: an integral cylindrical rim section having a pair of axially spaced radially outwardly extending tire retaining flanges, a pair of axially extending bead seats, and a contoured axially extending drop center section interposed between the bead seats, said drop center section including a straight axially extending section in the area of the minimum radius of the rim, and an angularly related section between said straight axial section of minimum radius and each of the said bead seats; a pair of axially spaced members each having a contoured cylindrical section and a radially inwardly extending flange, one of said members being secured to the straight axially extending section and the other secured to one of the remaining surfaces of said rim with the flanges carried by said members spaced apart axially; a radial disk having an inner section defining a central hub receiving aperture contoured to provide a plurality of stud receiving apertures, the radial disk terminating in a radially extending section positioned in overlapping relation radially with respect to and axially between the aforesaid inwardly directed flanges carried by the rim; and resilient deformable masses thermally bonded to the confronting surfaces of the overlapping portions of the said radially extending section of said disk and said inwardly extending axially spaced flanges carried by the rim respectively.

4. A vehicle wheel as claimed in claim 3 and further characterized in that the said radially extending section of said disk positioned in overlapping relation with said rim carried flanges is positioned at an angle in relation to the plane of rotation of said wheel and said rim carried flanges are likewise positioned and parallel to said overlapped section whereby force applied to said rim in a direction parallel to the plane of rotation of said wheel will result in arcuate movement of the rim in relation to the hub.

References Cited in the file of this patent

UNITED STATES PATENTS

| | | |
|---|---|---|
| 1,382,537 | Olson | June 21, 1921 |
| 1,939,935 | Wagenhorst | Dec. 19, 1933 |
| 2,090,179 | Brownyer | Aug. 17, 1937 |
| 2,216,715 | Ledwinka | Oct. 1, 1940 |
| 2,251,809 | Saurer | Aug. 5, 1941 |
| 2,528,156 | Maiorca | Oct. 31, 1950 |
| 2,533,176 | Oelkers | Dec. 5, 1950 |
| 2,646,308 | Boschi | July 21, 1953 |
| 2,704,664 | Hickman | Mar. 22, 1955 |

FOREIGN PATENTS

| | | |
|---|---|---|
| 897,066 | France | May 15, 1944 |
| 683,704 | Great Britain | Dec. 3, 1952 |